US008917189B2

(12) United States Patent
Mukaiyama

(10) Patent No.: US 8,917,189 B2
(45) Date of Patent: Dec. 23, 2014

(54) DRIVING ASSISTANCE DEVICE

(75) Inventor: Yoshio Mukaiyama, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 154 days.

(21) Appl. No.: 13/001,135

(22) PCT Filed: Jan. 13, 2009

(86) PCT No.: PCT/JP2009/050317
§ 371 (c)(1),
(2), (4) Date: Dec. 23, 2010

(87) PCT Pub. No.: WO2010/082302
PCT Pub. Date: Jul. 22, 2010

(65) Prior Publication Data

US 2011/0115647 A1 May 19, 2011

(51) Int. Cl.
*G08G 1/095* (2006.01)
*G08G 1/09* (2006.01)
*G06F 17/10* (2006.01)
*G01C 17/38* (2006.01)
*G08G 1/0962* (2006.01)
*G08G 1/0967* (2006.01)

(52) U.S. Cl.
CPC ...... *G08G 1/09623* (2013.01); *G08G 1/096716* (2013.01); *G08G 1/096783* (2013.01)
USPC ............ 340/907; 340/905; 701/301; 701/527

(58) Field of Classification Search
USPC .......................................................... 340/907
See application file for complete search history.

(56) References Cited

U.S. PATENT DOCUMENTS 6,624,782 B2 * 9/2003 Jocoy et al. ..................... 342/70
6,989,766 B2 * 1/2006 Mese et al. .................... 340/907

(Continued)

FOREIGN PATENT DOCUMENTS

JP 2002 245587 8/2002
JP 2004 171153 6/2004

(Continued)

OTHER PUBLICATIONS

International Search Report issued Apr. 21, 2009 in PCT/JP09/50317 filed Jan. 13, 2009.

(Continued)

*Primary Examiner* — Jennifer Mehmood
*Assistant Examiner* — John Mortell
(74) *Attorney, Agent, or Firm* — Oblon, Spivak, McClelland, Maier & Neustadt, L.L.P.

(57) ABSTRACT

Provided is a driving assistance device capable of assisting safer driving of a vehicle. A driving assistance device 1 assists the driving in a case where a subject-vehicle C is advancing in the right-turn direction at an intersection where a traffic light S is installed which has a right arrow-indicating green lamplight signal BA and a green lamplight signal B. The driving assistance device includes a road-to-vehicle communicator 10 which acquires the traffic light information on lighting of the traffic light S, a course change determination section 33 which determines whether or not the subject-vehicle C is advancing in the right-turn direction when the traffic light information indicates that the green lamplight signal B is lit, a signal schedule determination section 34 which determines whether or not the required time until the lighting of the right arrow-indicating green lamplight signal BA is equal to or more than a predetermined time when it is determined that the subject-vehicle C is advancing in the right-turn direction, and an HMI control section 35 which assists driving such that the subject-vehicle advances in the right-turn direction during the lighting of the right arrow-indicating green lamplight signal BA when it is determined that the required time is less than a predetermined time.

14 Claims, 5 Drawing Sheets

(56) References Cited

U.S. PATENT DOCUMENTS

| | | | | |
|---|---|---|---|---|
| 7,398,076 | B2 * | 7/2008 | Kubota et al. | 455/344 |
| 2006/0009188 | A1 | 1/2006 | Kubota et al. | |
| 2008/0015772 | A1 * | 1/2008 | Sanma et al. | 701/207 |
| 2008/0253615 | A1 | 10/2008 | Kubota et al. | |

FOREIGN PATENT DOCUMENTS

| | | |
|---|---|---|
| JP | 2005 147884 | 6/2005 |
| JP | 2005 309660 | 11/2005 |
| JP | 2006 48624 | 2/2006 |
| JP | 2006 285732 | 10/2006 |
| JP | 2008 299666 | 12/2008 |

OTHER PUBLICATIONS

International Preliminary Report on Patentability with Written Opinion issued on Aug. 16, 2011 in PCT/JP2009/050317 filed Jan. 13, 2009.

* cited by examiner

DRIVING ASSISTANCE DEVICE

TECHNICAL FIELD

The present invention relates to a driving assistance device which assists the driving in a case where a subject-vehicle is advancing in a first course direction at an intersection where a traffic light is installed which has a first signal indicating permission to advance in the first course direction through lighting and a second signal indicating permission to advance in a second course direction including the first course direction through lighting.

BACKGROUND ART

Conventionally, studies have been made regarding the provision of information on an oncoming vehicle which travels toward an intersection to a driver of a subject-vehicle who is waiting to right-turn at the intersection. For example, an information providing device for a vehicle which provides the anticipated time of arrival of the oncoming vehicle at the inside of the intersection is disclosed in Patent Literature 1.

CITATION LIST

Patent Literature 1: Japanese Patent Application Laid-open No. 2004-171153

SUMMARY OF INVENTION

Technical Problem

A signal (hereinafter referred to as an arrow-indicating green lamplight signal) capable of being lit in green, showing an arrow indicating a state where the subject-vehicle can proceed only in a predetermined direction, such as right-turn, even if a red light is shown by a traffic light, may be installed depending on an intersection. When the subject-vehicle proceeds in a predetermined direction at such an intersection, there is a timing at which proceeding in the predetermined direction after an arrow-indicating green lamplight signal is lit rather than attempting to proceed in the predetermined direction at a timing when the distance from the oncoming vehicle becomes large (the oncoming vehicle breaks off) on the basis of the arrival anticipation time described in Patent Literature 1 while a green lamplight signal (i.e., green signal) is lit in a traffic light allows a driver to perform easier driving and safer driving. That is, there is room for assisting safer driving.

Thus, the object of the invention is to provide a driving assistance device capable of assisting safer driving of a vehicle.

Solution to Problem

The driving assistance device of the invention is a driving assistance device which assists the driving in a case where a subject-vehicle is advancing in a first course direction at an intersection where a traffic light is installed which has a first signal indicating permission to advance in the first course direction through lighting and a second signal indicating permission to advance in a second course direction including the first course direction through lighting, the driving assistance device comprising: an acquisition means which acquires traffic light information on lighting of the traffic light; a first determination means which determines whether or not the subject-vehicle is advancing in the first course direction when the traffic light information acquired by the acquisition means indicates that the second signal is lit; a second determination means which determines whether or not the required time until the lighting of the first signal indicated by the traffic light information acquired by the acquisition means is equal to or more than a predetermined time when the first determination means has determined that the subject-vehicle is advancing in the first course direction; and an assisting means which assists driving such that the subject-vehicle advances in the first course direction during the lighting of the first signal when the second determination means has determined that the required time is less than a predetermined time.

In the invention, first, when the traffic light information indicates that the second signal is lit, it is determined whether or not the subject-vehicle is advancing in the first course direction. Here, when it is determined that the subject-vehicle is advancing in the first course direction, it is determined whether or not the required time until the lighting of the first signal is equal to or more than a predetermined time. Then, when it is determined that the required time is less than a predetermined time, driving is assisted so as to advance in the first course direction during the lighting of the first signal. For this reason, proceeding in the first course direction after the driver waits only for the required time until the lighting of the first signal which is less than a predetermined time and the first signal is lit rather than attempting to proceed in the first course direction at the timing when the distance from the oncoming vehicle becomes large during the lighting of the second signal allows a driver to perform easier driving and safer driving. As a result, it becomes possible to assist safer driving.

Additionally, preferably, when the second determination means has determined that the required time is equal to or more than a predetermined time, the assisting means assists driving so as to advance in the first course direction during the lighting of the second signal.

Thereby, when the second determination means has determined that the required time is equal to or more than a predetermined time, the assisting means assists driving so as to advance in the first course direction during the lighting of the second signal. For this reason, when it is determined that the required time until the lighting of the first signal is equal to or more than a predetermined time, driving is assisted so as to attempt to proceed in the first course direction at the timing when the distance from the oncoming vehicle becomes large during the lighting of the second signal rather than waiting until the lighting of the first signal. As a result, there is a possibility that a driver can advance the subject-vehicle in the first course direction without wasting time rather than waiting until the lighting of the first signal.

Additionally, preferably, the first course direction is a right-turn direction, the first signal is a right arrow-indicating green lamplight signal, and the second signal is a green lamplight signal.

Thereby, proceeding in the right-turn direction after the driver waits only for the required time until the lighting of the right arrow-indicating green lamplight signal which is less than a predetermined time rather than attempting to proceed in the right-turn direction at the timing when the distance from the oncoming vehicle becomes large during the lighting of the green lamplight signal, allows a driver to perform easier driving and safer driving. As a result, it becomes possible to assist safer driving at an intersection where the right arrow-indicating green lamplight signal is installed.

Advantageous Effects of Invention

According to the invention, it is possible to provide a driving assistance device capable of assisting safer driving of a vehicle.

REFERENCE SIGNS LIST

Figure 1:
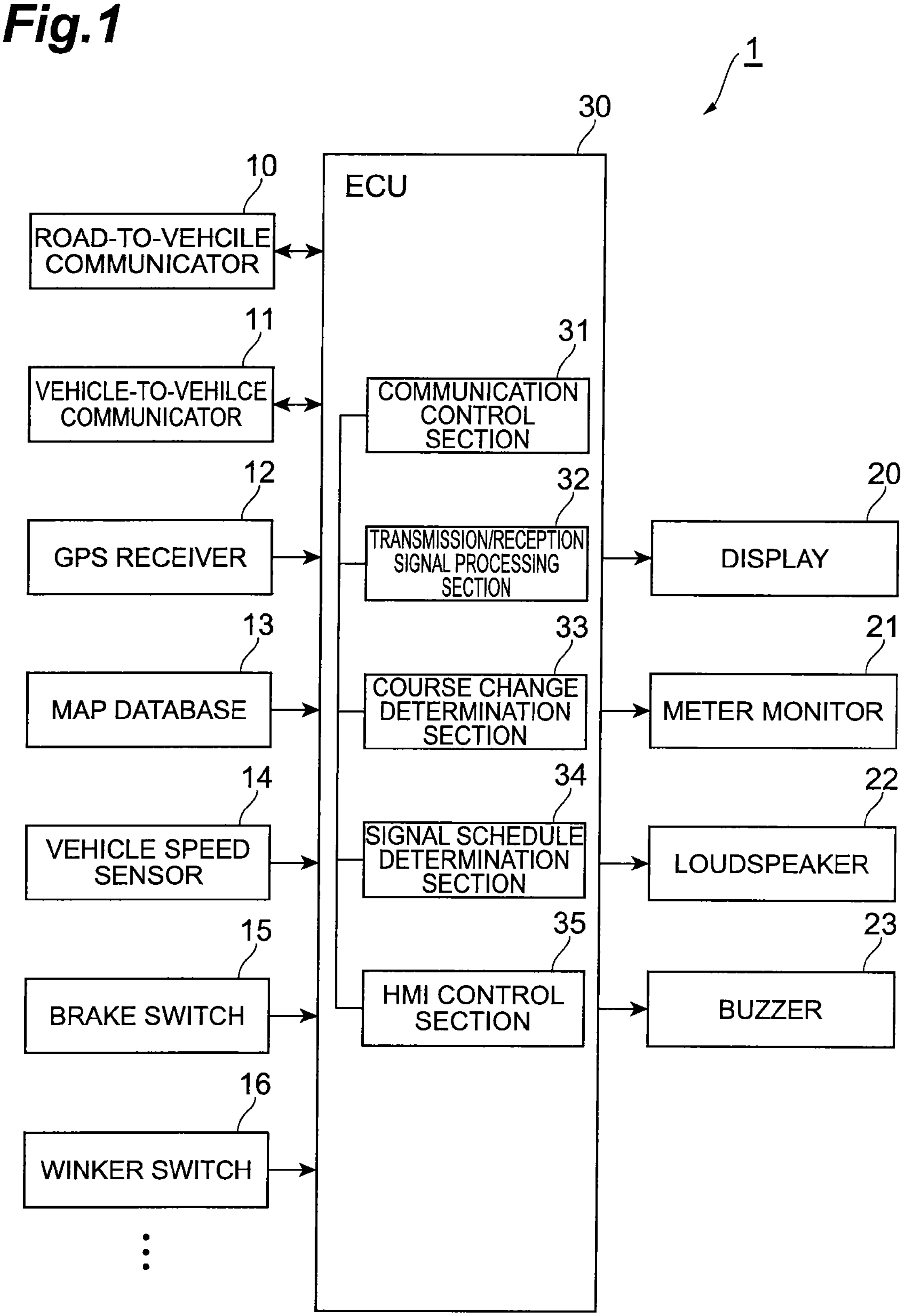
FIG. 1 is a schematic diagram illustrating the configuration of a driving assistance device related to the present embodiment.

1: DRIVING ASSISTANCE DEVICE
10: ROAD-TO-VEHICLE COMMUNICATOR
11: VEHICLE-TO-VEHICLE COMMUNICATOR
12: GPS RECEIVER
13: MAP DATABASE
14: VEHICLE SPEED SENSOR
15: BRAKE SWITCH
16: BLINKER SWITCH
20: DISPLAY
21: METER MONITOR
22: LOUDSPEAKER
23: BUZZER
31: COMMUNICATION CONTROL SECTION
32: TRANSMISSION/RECEPTION SIGNAL PROCESSING SECTION
33: COURSE CHANGE DETERMINATION SECTION
34: SIGNAL SCHEDULE DETERMINATION SECTION
35 : HMI CONTROL SECTION
Ac: RIGHT-TURN DIRECTION
B: GREEN LAMPLIGHT SIGNAL
BA: RIGHT ARROW-INDICATING GREEN LAMPLIGHT SIGNAL
C: SUBJECT-VEHICLE
F: ONCOMING VEHICLE
L: RIGHT-TURN SECTION
R: RED LAMPLIGHT SIGNAL
S: TRAFFIC LIGHT
tn: PRESENT TIME
Y: YELLOW LAMPLIGHT SIGNAL

DESCRIPTION OF EMBODIMENTS

Hereinafter, preferred embodiments of the invention will be described in detail with reference to the accompanying drawings. In addition, in order to facilitate understanding of description, in the respective drawings, the same reference numerals will be given to the same elements, and duplicate description will be omitted.

Figure 2:
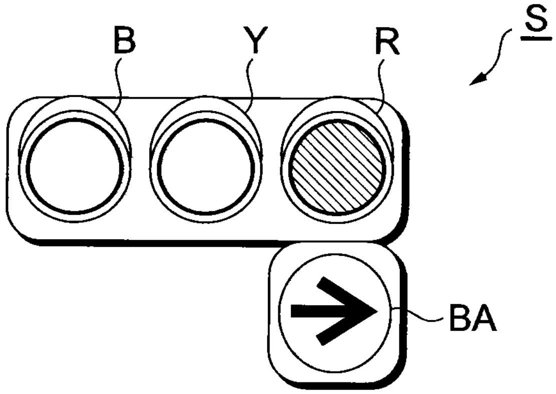
FIG. 2 is an explanatory view showing an example of a traffic light installed at an intersection.

First, the configuration of a driving assistance device related to the present embodiment, and an example of a traffic light installed at an intersection where the functions of this driving assistance device are exhibited will be described with reference to FIGS. 1 and 2. FIG. 1 is a schematic diagram of the configuration of a driving assistance device 1 related to the present embodiment, and FIG. 2 is an explanatory view showing an example of a traffic light S installed at an intersection where the functions of the driving assistance device 1 are exhibited. The driving assistance device 1 is a device which is mounted on a vehicle (hereinafter referred to as a subject-vehicle), such as an automobile, and which executes the driving assistance control of assisting, for example, the driving when the subject-vehicle is advancing in a first course direction (hereinafter referred to as a right-turn direction as an example) at an intersection where the traffic light S shown in FIG. 2 is mounted, through a screen display by a display serving as an HMI (Human Machine Interface), a voice output by a loudspeaker, a warning notification by a buzzer, and the like.

The traffic light S shown in FIG. 2 has a green lamplight signal B (second signal), a yellow lamplight signal Y, a red lamplight signal R, and a right arrow-indicating green lamplight signal BA (first signal). The right arrow-indicating green lamplight signal BA is a signal which indicates permission to advance in the right-turn direction (first course direction) through lighting, and the green lamplight signal B is a signal which indicates permission to advance in the right-turn direction, the left-turn direction, the straight-ahead direction, and the like through lighting.

As shown in FIG. 1, the driving assistance device 1 related to the present embodiment includes a road-to-vehicle communicator 10 (acquisition means), a vehicle-to-vehicle communicator 11 (acquisition means), a GPS receiver 12 (acquisition means), a map database 13 (acquisition means), a vehicle speed sensor 14 (acquisition means), a brake switch 15 (acquisition means), a blinker switch 16 (acquisition means), a display 20 (assisting means), a meter monitor 21 (assisting means), a loudspeaker 22 (assisting means), a buzzer 23 (assisting means), and an ECU 30 (Electronic Control Unit). The ECU 30 is constituted by a communication control section 31 (acquisition means), a transmission/reception signal processing section 32 (acquisition means), a course change determination section 33 (first determination means), a signal schedule determination section 34 (second determination means), and an HMI control section 35 (assisting means).

The road-to-vehicle communicator 10 is a wireless communicator for performing communication with a road-side communicator (for example, an optical beacon or an electric wave beacon). In the road-to-vehicle communicator 10, when the subject-vehicle is within a road-to-vehicle communication area, a subject-vehicle signal is transmitted to a road-side communicator by a road-to-vehicle communication antenna, and a road-side signal is received and acquired from the road-side communicator. The road-to-vehicle communicator 10 is reception-controlled by the ECU 30 and outputs the received road-side signal to the ECU 30. Additionally, the road-to-vehicle communicator 10 is reception-controlled by the ECU 30 and inputs the subject-vehicle signal from the ECU 30.

Here, the road-side signal includes traffic light information (for example, the distance to the traffic light S, the light color schedule information of the traffic light S, the light color which is lit at the present time, and the like) regarding the lighting of the traffic light S in the vicinity of the course of the subject-vehicle. The light color schedule information is information on a schedule which defines a cycle showing the switching timing of a light color to be lit. For example, light color at the present time, elapsed time after becoming the light color at the present time, and estimated time until switching to the next light color, and the like are indicated by this light color schedule information.

In the data received by road-to-vehicle communication, there are VICS (Vehicle Information Communication System) information, infrastructure data, and the like. The VICS data is road traffic information. As the VICS data, there are traffic congestion information, traffic regulation information, parking lot information, and the like. As the infrastructure data, there are road information, peripheral information, and the like. As the road information, there are road shape information, lane information, stop line information, limiting-speed information, the signal cycle information (i.e., the above light color schedule information) of each lane, and the like. As the peripheral information, there are information on surrounding buildings, information on pedestrian bridges, information on interchanges, and the like. As the data transmitted by road-to-vehicle communication, there are the identification number of a vehicle, and the like.

The road-side communicator is installed, for example, short of an intersection. The road-to-vehicle communication area is set according to the installation position, performance, and the like of this road-side communicator. The communication between the road-to-vehicle communicator 10 mounted on the vehicle, and the road-side communicator is possible only when a vehicle is within this road-to-vehicle communication area. Accordingly, in the driving assistance device 1, infrastructure data can also be acquired as information on another vehicle, such as an oncoming vehicle, only when a vehicle is traveling within the road-to-vehicle communication area.

The vehicle-to-vehicle communicator 11 is a wireless communicator for vehicle-to-vehicle communication. In the vehicle-to-vehicle communicator 11, a vehicle-to-vehicle signal is transmitted to other vehicles, such as an oncoming vehicle which is within a predetermined distance, through a vehicle-to-vehicle antenna, and a vehicle-to-vehicle signal is received from other vehicles, such as an oncoming vehicle which is within a predetermined distance. The vehicle-to-vehicle communicator 11 is reception-controlled by the ECU 30 and outputs the received vehicle-to-vehicle signal to the ECU 30. Additionally, the vehicle-to-vehicle communicator 11 is transmission-controlled by the ECU 30 and inputs the vehicle-to-vehicle signal from the ECU 30.

As the data received by vehicle-to-vehicle communication, there are the current position, vehicle speed, advancing direction, acceleration, vehicle type, vehicle size, body color, and the like of other vehicle, such as an oncoming vehicle. As the data transmitted by vehicle-to-vehicle communication, there are the current position, vehicle speed, advancing direction, acceleration, vehicle type, vehicle size, body color, and the like of the subject-vehicle. The current position, vehicle speed, advancing direction, acceleration, and the like in this communication data between vehicles are information detected on the vehicle side. For example, the current position is a position detected by the GPS receiver 12, and the vehicle speed is a vehicle speed detected by the vehicle speed sensor 14.

The GPS receiver 12 is equipment for estimating the current position or the like of the subject-vehicle using GPS. In the GPS receiver 12, a GPS signal from a GPS satellite is received through a GPS antenna at regular time intervals, the GPS signal is demodulated, and the current position (latitude and longitude) or the like of the subject-vehicle etc. is calculated on the basis of the position data of each GPS satellite which has been demodulated. Also, in the GPS receiver 12, the current position information or the like of the subject-vehicle is transmitted to the ECU 30. Additionally, only reception processing of a GPS signal may mainly be performed in the GPS receiver 12, and calculation processing of the current position based on the GPS signal may be performed by the ECU 30.

The map database 13 is constructed in a predetermined region of the storage unit of the driving assistance device 1. Road shape information, lane information, intersection shape information, and the like are stored in the map database 13. In addition, information on road-to-vehicle communication area or infrastructure detection area, information on surrounding buildings, information on pedestrian bridges, information on interchanges, and the like may be stored in the map database 13.

The vehicle speed sensor 14 is a sensor which detects the speed of a vehicle. In the vehicle speed sensor 14, a vehicle speed is detected at regular time intervals, and the detected vehicle speed is transmitted to the ECU 30 as a vehicle speed signal.

The brake switch 15 is a switch which detects whether or not a brake pedal is stepped on by a driver (ON/OFF of a brake pedal). In the brake switch 15, ON/OFF of the brake pedal is transmitted to the ECU 30 as a brake signal at regular time intervals.

The blinker switch 16 is a switch for a driver to input the direction indication (i.e., ON and OFF of each of a right blinker and a left blinker). In the blinker switch 16, blinker operation information of a driver is transmitted to the ECU 30 as a blinker signal. The information detected by the vehicle speed sensor 14, the brake switch 15, and the blinker switch 16 is transmitted to other vehicles, such as an oncoming vehicle, as vehicle-to-vehicle communication data. In addition to these, various kinds of information, such as the advancing direction or the like of a vehicle, are detected, and are utilized in the driving assistance device 1.

The display 20 is a vehicle-mounted display shared with a navigation system or the like. In the display 20, when an image signal from the ECU 30 is received, an image shown by the image signal is displayed.

The meter monitor 21 is a monitor which displays the information detected by a speedometer.

The loudspeaker 22 is a vehicle-mounted loudspeaker shared with other systems. In the loudspeaker 22, when a voice signal is received from the ECU 30, voice is output according to the voice signal.

The buzzer 23 is a buzzer for alarming which announces the timing in a case where the subject-vehicle is advancing in the right-turn direction. In the buzzer 23, when a buzzer signal is received from the ECU 30, buzzer sound is output according to the buzzer signal. The display 20, the meter monitor 21, the loudspeaker 22, and the buzzer 23 function as means of HMI in the driving assistance device 1.

The ECU 30 is an electronic control unit consisting of a CPU (Central Processing Unit), a ROM (Read Only Memory), a RAM (Random Access Memory), and the like, and performs integrated control of the driving assistance device 1. In the ECU 30, the communication control section 31, the transmission/reception signal processing section 32, the course change determination section 33, the signal schedule determination section 34, and the HMI control section 35 are configured by loading an application program for driving assistance device 1 stored in the ROM to the RAM, and executing the application program.

The communication control section 31 controls the road-to-vehicle communication by the road-to-vehicle communicator 10 and the vehicle-to-vehicle communication by the vehicle-to-vehicle communicator 11. In the communication control section 31, the road-to-vehicle communicator 10 is brought into a standby state when the subject-vehicle is outside the road-to-vehicle communication area, and reception control of a road-side signal and transmission control of a subject-vehicle signal is performed on the road-to-vehicle communicator 10 when the subject-vehicle is within the road-to-vehicle communication area. In this case, in the communication control section 31, a subject-vehicle signal consisting of an identification number or the like of the subject-vehicle is created. Additionally, in the communication control section 31, the vehicle-to-vehicle communicator 11 is brought into a normally operating state, and reception control of the vehicle-to-vehicle signal from other vehicle, such as an oncoming vehicle, and transmission control of the vehicle-to-vehicle signal of the subject-vehicle is performed on the vehicle-to-vehicle communicator 11. In this case, in the communication control section 31, the vehicle-to-vehicle signal of the subject-vehicle consisting of information, such as the current position, vehicle speed, advancing direction, and acceleration which are detected at regular time intervals, or the vehicle type, vehicle size, body color, and the like of the subject-vehicle which are stored in advance, are created.

The transmission/reception signal processing section 32 performs various kinds of processing on the road-side signal received by the road-to-vehicle communicator 10 and the vehicle-to-vehicle signal received by the vehicle-to-vehicle communicator 11 so as to become data which are handled within the ECU 30. For example, adjustment of the units of data and adjustment of detection time of data are performed.

The course change determination section 33 is an operation algorithm section which determines whether or not the subject-vehicle is advancing in the right-turn direction when the traffic light information acquired by the road-to-vehicle communicator 10 indicates that the green lamplight signal B is lit. It is determined that the subject-vehicle is advancing in the right-turn direction when the subject-vehicle C is in a right-turn section (i.e., a section from a right-turn lane to an approach lane for right-turn within an intersection) and is waiting to right-turn and when intention of right-turn can be confirmed by input of ON of a right blinker. This determination is performed using the road-to-vehicle communicator 10, the vehicle-to-vehicle communicator 11, the GPS receiver 12, the map database 13, the vehicle speed sensor 14, the brake switch 15, the blinker switch 16, and the like.

The signal schedule determination section 34 is an operation algorithm section which determines whether or not the required time (i.e., remaining time) until the lighting of the right arrow-indicating green lamplight signal BA is equal to or more than a specified predetermined time when the course change determination section 33 determines that the subject-vehicle is advancing in the right-turn direction. The required time until the lighting of the right arrow-indicating green lamplight signal BA is indicated by the traffic light information acquired by the road-to-vehicle communicator 10. Additionally, this predetermined time is the time required when a vehicle actually turns to the right at this intersection, for example, the total time of three kinds of times including the determination time for determining the situation around the intersection, the traveling time for traveling the intersection, the reserve time as a reserve, and is a time (for example, about 10 seconds) of such a degree that a driver does not feel the time is a long time to wait and troublesome.

The HMI control section 35 is an interface section which assists the driving which is advancing in the right-turn direction during the lighting of the right arrow-indicating green lamplight signal BA when the signal schedule determination section 34 has determined that the required time is not equal to or more than a predetermined time (i.e., is less than a predetermined time). The HMI control section 35 executes the driving assistance control (i.e., signal stop driving assistance) which urges a driver to wait until the right arrow-indicating green lamplight signal BA is lit and advance in the right-turn direction during the lighting, using the display 20, the meter monitor 21, the loudspeaker 22, and the buzzer 23.

On the other hand, when the signal schedule determination section 34 has determined that the required time is equal to or more than a predetermined time, the HMI control section 35 executes the driving assistance control (i.e., driving assistance related to an oncoming vehicle) which urges a driver to advance in the right-turn direction at the timing such that the distance from the oncoming vehicle based on a communication result by the road-to-vehicle communicator 10 and the vehicle-to-vehicle communicator 11 becomes large (i.e., the oncoming vehicle breaks off) during the lighting of the green lamplight signal B. The HMI control section 35 creates image information based on a determination result by the signal schedule determination section 34, and transmits an image signal consisting of the image information to the display 20.

Additionally, the HMI control section 35 creates voice information for reading out a signal which is lit at the time when the vehicle should advance in the right-turn direction on the basis of a determination result by the signal schedule determination section 34, and transmits a voice signal consisting of the voice information to the loudspeaker 22. Moreover, the HMI control section 35 creates buzzer information corresponding to a signal which is lit at the time when the vehicle should advance in the right-turn direction on the basis of a determination result by the signal schedule determination section 34, and transmits a buzzer signal consisting of the buzzer information to the loudspeaker 22. As described above, in the HMI control section 35, whether priority is given to the signal stop driving assistance or priority is given to the driving assistance related to an oncoming vehicle can be changed sequentially. When these two driving assistances are simultaneously allowed, for example, simultaneous assistance in which the size or the like of indicator charts or characters is clearly changed and priority is given to any assistance may be performed, and a voice output or buzzer warning may be used only for assistance with a higher priority.

Figure 3:
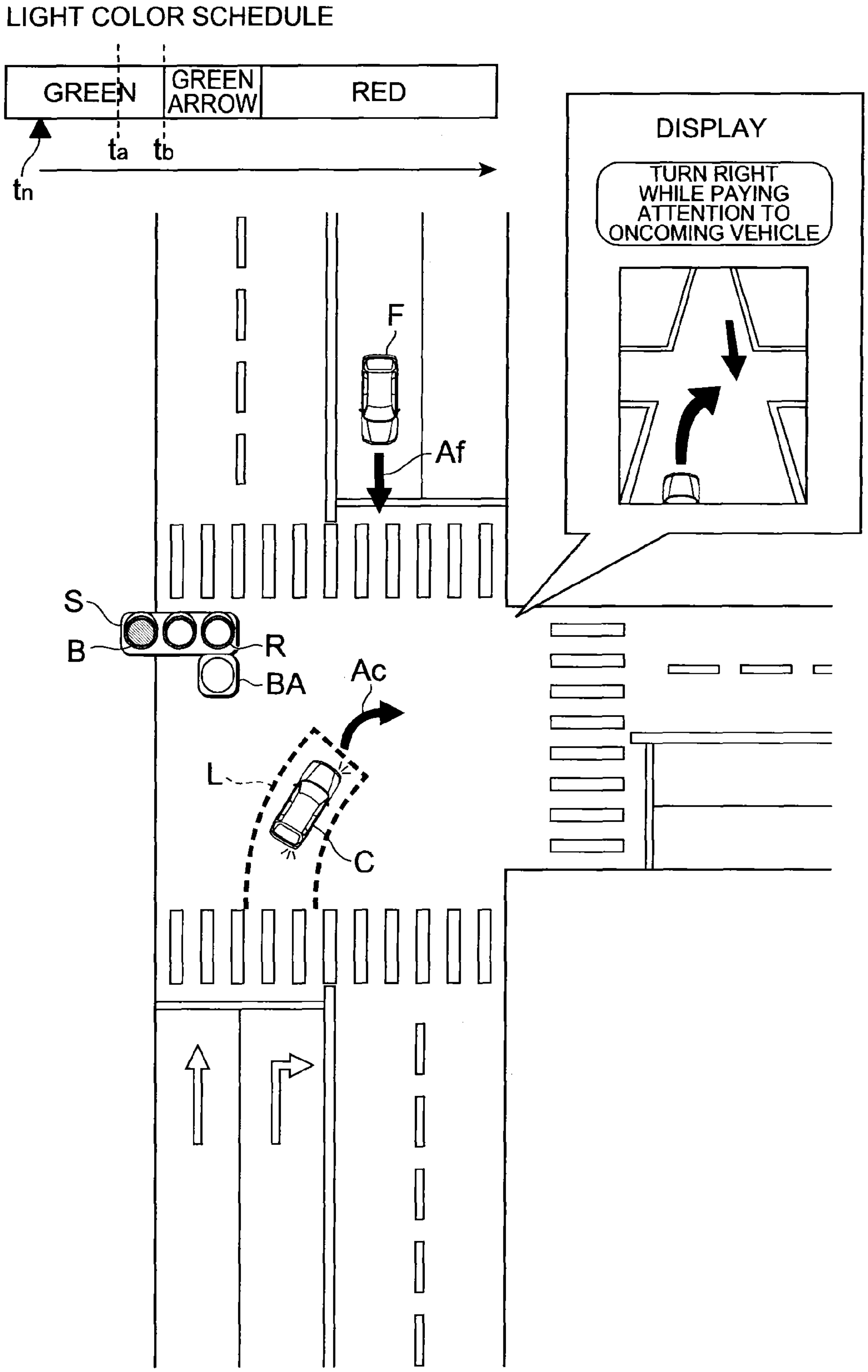
FIG. 3 is an explanatory view illustrating the driving assistance control by an HMI control section when the required time until the lighting of a right arrow-indicating green lamplight signal is equal to or more than a predetermined time.
Figure 4:
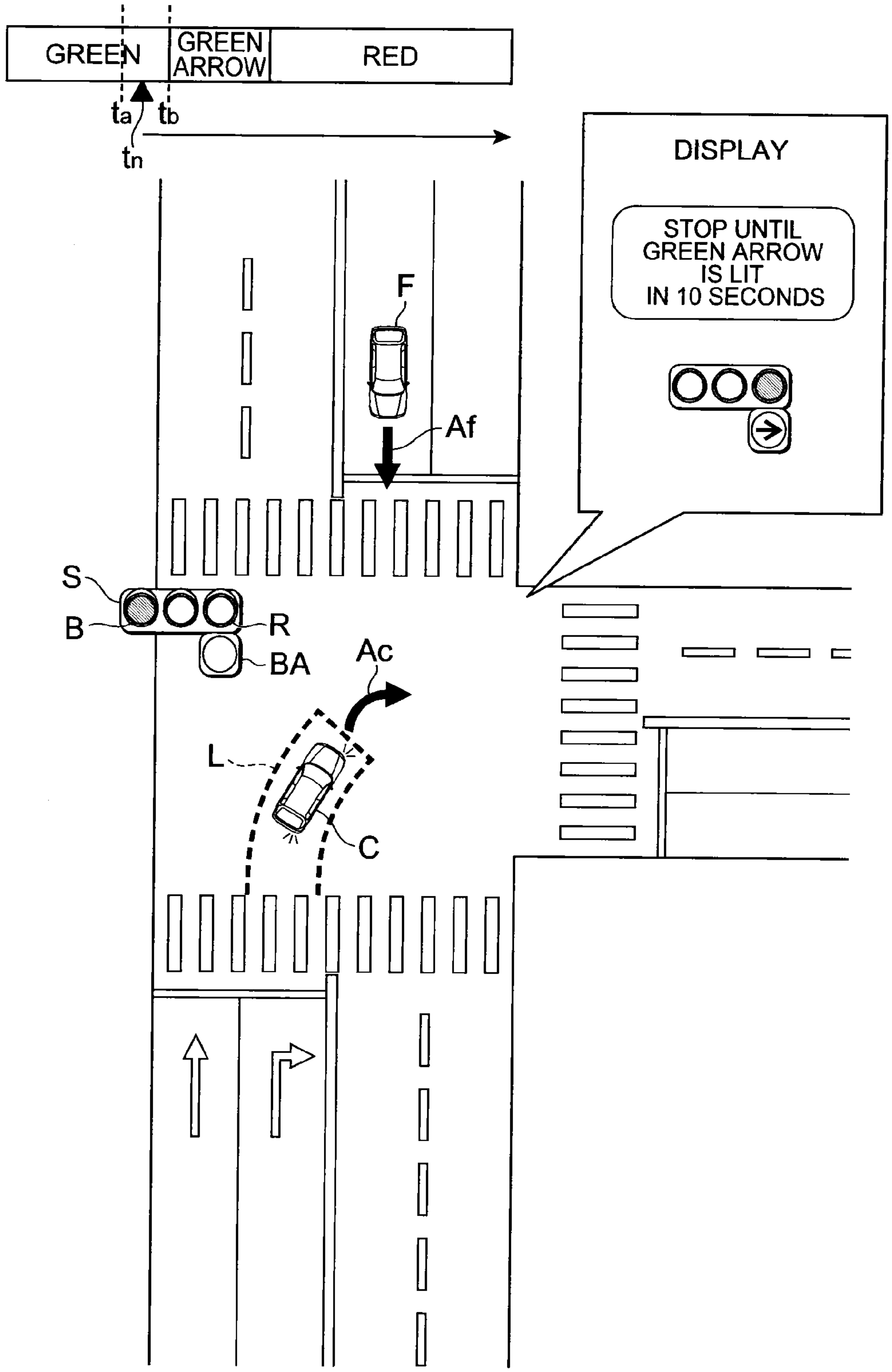
FIG. 4 is an explanatory view illustrating the driving assistance control by the HMI control section when the required time until the lighting of the right arrow-indicating green lamplight signal is less than a predetermined time.

Subsequently, differences in the driving assistance control by the HMI control section 35 which depend on whether or not the required time until the lighting of the right arrow-indicating green lamplight signal BA is equal to or more than a predetermined time will be described with reference to FIGS. 3 and 4. FIG. 3 is an explanatory view illustrating the driving assistance control by the HMI control section 35 when the above required time is equal to or more than a predetermined time, and FIG. 4 is an explanatory view describing the driving assistance control by the HMI control section 35 when the above required time is less than a predetermined time.

First, the driving assistance control by the HMI control section 35 when the required time until the lighting of the right arrow-indicating green lamplight signal BA is equal to or more than a predetermined time will be described with reference to FIG. 3. The positional relationship in a state where the subject-vehicle C is advancing in the right-turn direction Ac is shown at a central portion of FIG. 3, the light color schedule information on the traffic light S in which the passage of time is indicated by an arrow is shown at an upper portion of FIG. 3, and a display displayed on the display 20 by the HMI control section 35 is shown at an upper right portion of FIG. 3.

First, when the presently shown (i.e., shown at the present time tn) light color of the traffic light S is green and the subject-vehicle C is in the right-turn section L (i.e., a section from a right-turn lane to an approach lane for right-turn within an intersection) and a right blinker is turned on, the course change determination section 33 determines that the subject-vehicle C is advancing in the right-turn direction Ac. Here, the signal schedule determination section 34 determines that the elapsed time (i.e., tn to tb) until the lighting of a green arrow (i.e., right arrow-indicating green lamplight signal BA) is equal to or more than a predetermined time (i.e., ta to tb). Then, the HMI control section 35 performs a display which urges a driver to advance carefully in the right-turn direction Ac at the timing when the distance from the oncoming vehicle F becomes large (i.e., the oncoming vehicle F breaks off) during the lighting of the green lamplight signal B.

Next, the driving assistance control by the HMI control section 35 when the required time until the lighting of the right arrow-indicating green lamplight signal BA is less than a predetermined time will be described with reference to FIG. 4. The positional relationship in a state where the subject-vehicle C is advancing in the right-turn direction Ac is shown at a central portion of FIG. 4, the light color schedule information on the traffic light S in which the passage of time is indicated by an arrow is shown at an upper portion of FIG. 4, and the display displayed on the display 20 by the HMI control section 35 is shown at an upper right portion of FIG. 4.

First, when the presently shown (i.e., shown at the present time tn) light color of the traffic light S is green and the subject-vehicle C is in the right-turn section L (i.e., a section from a right-turn lane to an approach lane for right-turn within an intersection) and a right blinker is turned on, the course change determination section 33 determines that the subject-vehicle C is advancing in the right-turn direction Ac. Here, the signal schedule determination section 34 determines that the elapsed time (i.e., tn to tb) until the lighting of a green arrow (i.e., right arrow-indicating green lamplight signal BA) is less than a predetermined time (i.e., ta to tb). Also, the HMI control section 35 performs a display which urges a driver to wait until the right arrow-indicating green lamplight signal BA and the red lamplight signal R are lit and to advance in the right-turn direction Ac during the lighting while showing this required time (i.e., remaining time) to the driver.

Figure 5:
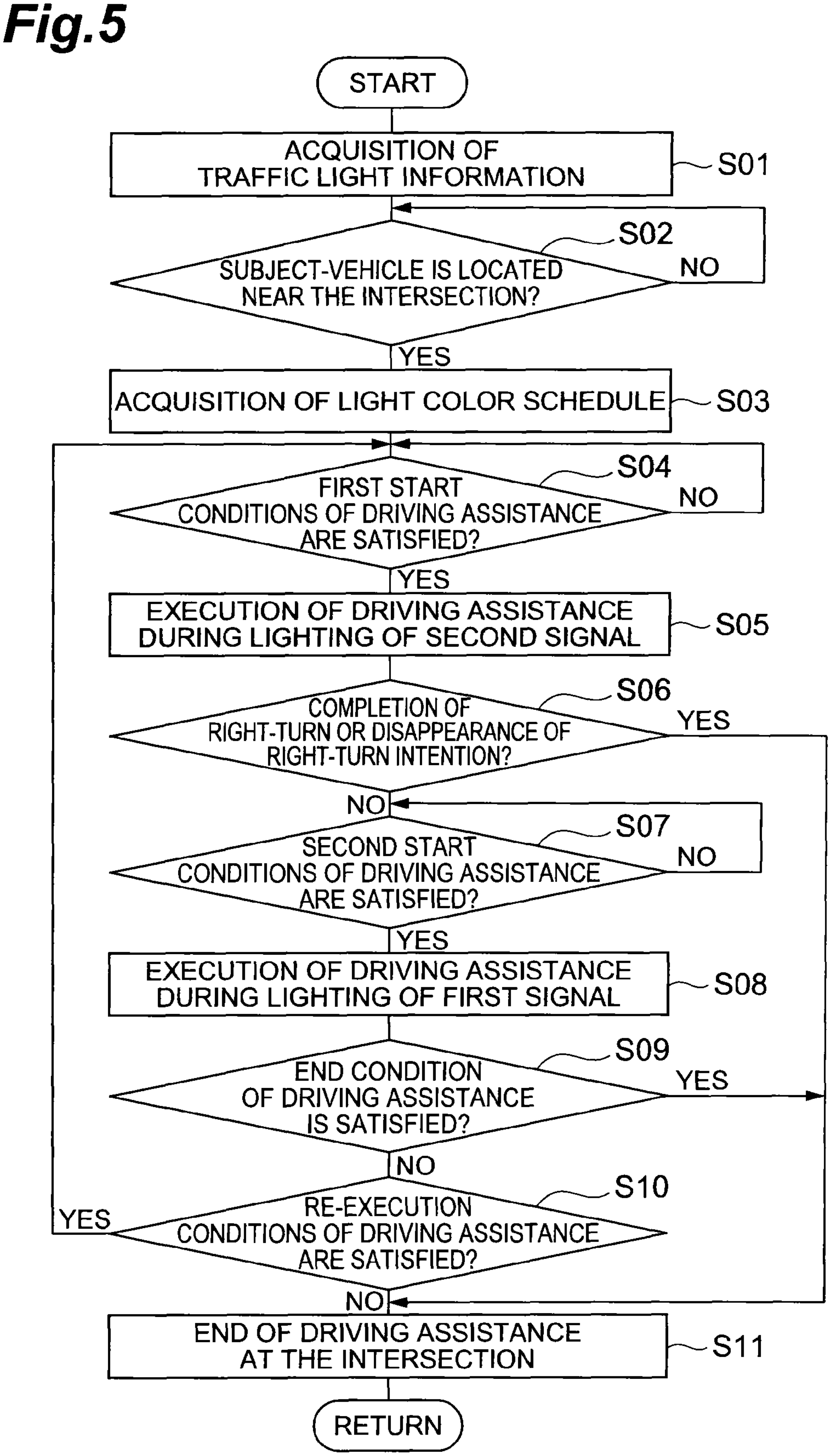
FIG. 5 is a flow chart for explaining the processing procedure of the driving assistance control executed in the driving assistance device.

Subsequently, the processing procedure of the driving assistance control executed by the driving assistance device 1 will be described with reference to FIG. 5. FIG. 5 is a flow chart for explaining the processing procedure of the driving assistance control executed in the driving assistance device 1. The processing shown in the flow chart of FIG. 5 is performed mainly by the above-described ECU, and is repeatedly executed at predetermined time intervals until a power source of the driving assistance device 1 is turned off after the power source is turned on and the processing begins.

First, the road-to-vehicle communicator 10 acquires traffic light information by performing communication with the road-side communicator (Step S01). When the traffic light information is acquired, the road shape information, lane information, intersection shape information, and the like stored in a navigation system or the map database 13 are used together, and the information on an intersection where the right arrow-indicating green lamplight signal BA and the green lamplight signal B are installed is acquired. Then, the course change determination section 33 determines whether or not the subject-vehicle C is located near the intersection where the right arrow-indicating green lamplight signal BA and the green lamplight signal B are installed, on the basis of this traffic light information (Step S02).

Here, when it is determined that the subject-vehicle C is not located at the intersection, this determination is performed again. This determination is performed until the subject-vehicle C moves to the intersection through the movement of the subject-vehicle C. On the other hand, when it is determined that the subject-vehicle C is located at the intersection, the course change determination section 33 extracts and acquires light color schedule information from the above traffic light information (Step S03). In addition, Step S01 and Step S03 may be replaced with each other. That is, a change to the processing procedure including the acquisition of the light color schedule information by the communication with the road-side communicator, the determination of whether or not the subject-vehicle is located near the intersection in Step S02, and the acquisition of the traffic light information in Step S01 may be made.

Next, the course change determination section 33 and the signal schedule determination section 34 determine whether or not first start conditions for starting the driving assistance control are satisfied (Step S04). The first start conditions of this driving assistance are all of the three conditions that the presently shown light color of the traffic light S is green and the required time until the lighting of the right arrow-indicating green lamplight signal BA is equal to or more than a predetermined time, that the subject-vehicle C is in the above right-turn section L, and that the right blinker is turned on and the intention of right-turn can be confirmed. When all three of these conditions are satisfied, it is determined that the first start conditions of this driving assistance are satisfied. When it is not determined that the first start conditions of this driving assistance are satisfied, this determination is performed again. This determination is performed until the first start conditions of the driving assistance are satisfied.

On the other hand, when it is determined that the first start conditions of this driving assistance are satisfied, the HMI control section 35 performs a driving assistance which urges a driver to advance in the right-turn direction Ac at the timing when the distance from the oncoming vehicle F becomes large (i.e., the oncoming vehicle F breaks off) during the lighting of the green lamplight signal B which is a second signal (Step S05). Here, the course change determination section 33 determines whether the right-turn of the subject-vehicle C has been completed or the right blinker is turned off and there is no longer the intention to right-turn (Step S06). When it is determined that the right-turn of the subject-vehicle C is not completed and that the right blinker is turned on and the intention of right-turn can be confirmed, the processing proceeds to Step S11 which will be described later.

On the other hand, when it is determined whether the right-turn of the subject-vehicle C has been completed or the right blinker is turned off and there is no longer the intention to right-turn, the course change determination section 33 and the signal schedule determination section 34 determines whether or not second start conditions for starting the driving assistance control are satisfied (Step S07). The second start conditions of this driving assistance are all three of the conditions that the presently shown light color of the traffic light S is green and the required time until the lighting of the right arrow-indicating green lamplight signal BA is less than a predetermined time, that the subject-vehicle C is in the above right-turn section L, and that the right blinker is turned on and the intention of right-turn can be confirmed. When all three of these conditions are satisfied, it is determined that the second start conditions of this driving assistance are satisfied.

When it is not determined that the second start conditions of this driving assistance are satisfied, this determination is performed again. This determination is performed until the second start conditions of the driving assistance are satisfied. On the other hand, when it is determined that the second start conditions of this driving assistance are satisfied, the HMI control section 35 performs a driving assistance which urges a driver to wait until the right arrow-indicating green lamplight signal BA which is the first signal is lit and to advance in the right-turn direction Ac during the lighting (Step S08). At this time, the HMI control section 35 displays the remaining time until the right arrow-indicating green lamplight signal BA is lit to the driver, thereby performing provision of information. Instead of the display of this remaining time, the remaining time may be read out by voice, a bar graph which indicates a form in which the remaining time becomes shorter through changes in the length of a bar may be displayed, or an intermittent sound in which a cycle changes may be produced. In addition, after the lighting of the right arrow-indicating green lamplight signal BA, the HMI control section 35 performs a driving assistance which urges a driver to advance in the right-turn direction Ac during the lighting of the right arrow-indicating green lamplight signal BA.

Here, the course change determination section 33 determines whether or not an ending condition for ending the driving assistance control is satisfied (Step S09). The ending condition of this driving assistance is any of two conditions that the lighting of the right arrow-indicating green lamplight signal BA has ended (i.e., the presently shown light color of the traffic light S is only yellow or only red) and that the right-turn of the subject-vehicle C has been completed or the right blinker is turned off and there is no longer the intention to right turn. When any of these two conditions is satisfied, it is determined that the ending condition of this driving assistance is satisfied. When it is determined that the ending condition of this driving assistance is satisfied, the processing proceeds to Step S11 which will be described later.

On the other hand, when it is not determined that the ending condition of this driving assistance is satisfied, the course change determination section 33 and the signal schedule determination section 34 determine whether or not re-execution conditions for re-executing the driving assistance control are satisfied (Step S10). The re-execution conditions of this driving assistance are all two conditions that the presently shown light color of the traffic light S is green and the required time until the lighting of the right arrow-indicating green lamplight signal BA is equal to or more than a predetermined time, and that the right blinker is turned on and the intention of right-turn can be confirmed. When all two of these conditions are satisfied, it is determined that the re-execution conditions of this driving assistance are satisfied. When it is determined that the re-execution conditions of this driving assistance are satisfied, the processing returns and proceeds to the above Step S04. On the other hand, when it is not determined that the re-execution conditions of this driving assistance are satisfied, the processing proceeds to Step S11 which will be described later.

The, the course change determination section 33 and the HMI control section 35 perform end processing of this driving assistance control (Step S11). Specifically, the course change determination section 33 returns to an initial state, and the HMI control section 35 transmits an image signal which informs a driver of the purport of the end of the driving assistance control to the display 20 and displays the purport.

Subsequently, the working effects of the present embodiment will be described. According to the present embodiment, when the traffic light information indicates that the green lamplight signal B is lit it is determined whether or not the subject-vehicle C is advancing in the right-turn direction Ac. Here, when it is determined that the subject-vehicle C is advancing in the right-turn direction Ac, it is determined whether or not the required time until the lighting of the right arrow-indicating green lamplight signal BA is equal to or more than a predetermined time. Then, when it is determined that the required time is less than a predetermined time, driving is assisted so as to wait to the lighting of the right arrow-indicating green lamplight signal BA and advance in the right-turn direction Ac during the lighting.

For this reason, proceeding in the right-turn direction Ac after the driver waits only for the required time until the lighting of the right arrow-indicating green lamplight signal BA which is less than a predetermined time, switching to the right arrow-indicating green lamplight signal BA is made, and the right arrow-indicating green lamplight signal is lit according to the driving assistance rather than attempting to interrupt aiming at the timing when the distance from the oncoming vehicle F becomes large and to forcibly proceed in the right-turn direction Ac during the lighting of the green lamplight signal B eliminates wasted effort of the driver, such as viewing the oncoming vehicle F, and enables easier driving and safer driving.

Particularly, when the subject-vehicle C is a leading vehicle in a row of vehicles which are waiting to right-turn, and an oncoming vehicle which is waiting to right-turn exists before the driver's eyes, it is difficult to know the timing when the distance from the oncoming vehicle F becomes large. However, according to the present embodiment, since the driver just has to wait for the above required time and advance the subject-vehicle in the right-turn direction Ac irrespective of the distance from the oncoming vehicle F, safe driving becomes possible. Additionally, when there are many successive vehicles which are waiting to right-turn, a driver is released from the feeling of pressure that he/she feels, and a feeling of comfort is given. Moreover, it is possible for a driver to make driving preparations in advance, such as mental attitude and mood preparation at the start of right-turn, expectation, and release of PKB (i.e., parking brake), and it becomes possible to start a smooth right-turn. Additionally, the need of a driver who wants to know the remaining time until the lighting of the right arrow-indicating green lamplight signal BA can also be satisfied. As a result, it becomes possible to assist safer driving at an intersection where the right arrow-indicating green lamplight signal BA is mounted.

Additionally, when the signal schedule determination section 34 has determined that the required time is equal to or more than a predetermined time, the HMI control section 35 assists driving so that the subject-vehicle advances in the right-turn direction Ac during the lighting of the green lamplight signal B. For this reason, when it is determined that the required time until the lighting of the right arrow-indicating green lamplight signal BA is equal to or more than a predetermined time, driving is assisted so as to attempt to proceed in the right-turn direction Ac at the timing when the distance from the oncoming vehicle F becomes large during the lighting of the green lamplight signal B rather than waiting until the lighting of the right arrow-indicating green lamplight signal BA. As a result, there is a possibility that a driver can advance the subject-vehicle in the right-turn direction Ac without wasting time rather than waiting until the lighting of the right arrow-indicating green lamplight signal BA.

Although a preferred embodiment of the invention has been described, the invention is not limited to the above embodiment. For example, in the above embodiment, the right arrow-indicating green lamplight signal BA is used as the first signal and the right-turn direction Ac is used as the first course direction. However, an arrow-indicating green lamplight signal which indicates other directions may be used instead of the right arrow-indicating green lamplight signal BA, and a direction corresponding to the arrow-indicating green lamplight signal may be used as the first course direction.

Industrial Applicability

According to the invention, it is possible to provide a driving assistance device capable of assisting safer driving of a vehicle.

The invention claimed is:

1. An assistance device which assists a subject-vehicle in a case where the subject-vehicle advances in a first course direction at an intersection where a traffic light is installed which has a first signal which indicates permission to advance in the first course direction traversing a lane in which traffic flows in a direction opposite to that of the subject-vehicle and a second signal which indicates permission to advance in a second course direction including the first course direction and proceeding straight through light, the assistance device comprising:

a receiver configured to receive traffic light information of the traffic light; and a controller configured to:

determine, as a first determination, whether or not the subject-vehicle advances in the first course direction when the traffic light information received by the receiver indicates that the second signal is lit;

when the first determination has determined that the subject-vehicle advances in the first course direction, determine, as a second determination, whether or not a first time is equal to or greater than a second time, the first time being a required time until the first signal will be lit indicated by the traffic light information received by the receiver, and the second time being a predetermined time required for the subject-vehicle to advance in the first course direction including a time required for the subject-vehicle to travel through the intersection in the first course direction;

assist such that the subject-vehicle advances in the first course direction during the lighting of the first signal when the second determination has determined that the first time is less than the second time; and assist so as to advance in the first course direction during the lighting of the second signal when the first signal is not lit and when the second determination has determined that the first time is equal to or greater than the second time.

2. The assistance device according to claim 1, wherein the first course direction is a left-turn direction, the first signal is a left arrow-indicating green lamplight signal, and the second signal is a green lamplight signal.

3. The driving assistance device according to claim 1, wherein if the first time is equal to or greater than the second time, the assist means assists at a time when a distance from the oncoming vehicle is large.

4. An assistance device which assists a subject-vehicle in a case where the subject-vehicle is advances in a first course direction at an intersection where a traffic light is installed which has a first signal which indicates permission to advance in the first course direction traversing a lane in which traffic flows in a direction opposite to that of the subject-vehicle and a second signal which indicates permission to advance in a second course direction including the first course direction and proceeding straight through light, the assistance device comprising:

an electronic control unit having program logic, which when executed:

determines whether or not the subject-vehicle advances in the first course direction when acquired traffic light information indicates that the second signal is lit;

determines, when it has been determined that the subject-vehicle advances in the first course direction, whether or not a first time is equal or greater than a second time, the first time being a required time until the first signal is lit indicated by the acquired traffic light information, and the second time being a predetermined time required for the subject-vehicle to advance in the first course direction including a time required for the subject-vehicle to travel through the intersection in the first course direction;

assists such that the subject-vehicle advances in the first course direction during the lighting of the first signal when it has been determined that the first time is less than the second time; and assists so as to advance in the first course direction during the lighting of the second signal when the first signal is not lit and when the second determination has determined that the first time is equal to or greater than the second time.

5. The assistance device according to claim 1, wherein the second time further includes a determination time for determining a situation around the intersection.

6. The assistance device according to claim 1, wherein the second time further includes a reserve time.

7. The assistance device according to claim 5, wherein the second time further includes a reserve time.

8. The assistance device according to claim 1, wherein the second time is about 10 seconds.

9. The assistance device according to claim 5, wherein the second is about 10 seconds.

10. The assistance device according to claim 6, wherein the second time is about 10 seconds.

11. The assistance device according to claim 7, wherein the second time is about 10 seconds.

12. The assistance device according to claim 1, wherein the receiver further receives vehicle state information of an oncoming vehicle.

13. The assistance device according to claim 12, wherein the receiver receives the vehicle state information of the oncoming vehicle via vehicle-to-vehicle communication.

14. The assistance device according to claim 12, wherein the vehicle state information of the oncoming vehicle includes at least one of a current position, a vehicle speed, an advancing direction, and an acceleration.

* * * * *